May 30, 1967 A. K. JENSEN 3,322,261
ARTICLE SENSING APPARATUS
Filed Feb. 14, 1966 2 Sheets-Sheet 1

INVENTOR
ALAN K. JENSEN
BY [signature]
ATTORNEY

INVENTOR
ALAN K. JENSEN
BY David Teschner
ATTORNEY 3,322,261

ARTICLE SENSING APPARATUS

Alan K. Jensen, Livingston, N.J., assignor to Monroe International Corporation, Orange, N.J., a corporation of Delaware Filed Feb. 14, 1966, Ser. No. 527,285
12 Claims. (Cl. 198—232)

This invention pertains to an article sensing device and more particularly a device for sensing the orientation of an article as it is passed through an article handling device.

In article handling systems employed today, it is necessary that the article, which may be, for example, a record card, must be properly oriented with respect to the path of movement of the article through the article handling apparatus to permit the proper recording or reading of information thereon and to prevent the device from being jammed or otherwise malfunctioning. For example, with a record card coded according to the standard Hollerith code the presentation of an inverted record card will cause punching of information intended for the ninth numeric index position to be recorded in the twelfth index position. The reading of information punched in this manner upon such a record card with the record card then properly oriented would be totally useless and might even cause the device to operate in a manner undesired. Further, many of the safety devices employed to protect the movement of the article and those devices necessary to operate upon the article might be rendered totally inoperative or may cause the mishandling of the article or record itself.

In devices presently used in the art, apparatus is provided for preventing the skewing of a record card or misalignment of the record card as it is moved along the path of movement of the article handling device. However, limited provisions are made to insure proper orientation of the record card as presented to the article handling apparatus. These devices generally rely upon the proper placement of each and every one of the articles or record cards in the feed hoppers for the apparatus before the feed operation is begun. Should the deck of articles or record cards, for example, be incorrectly placed in the feed hopper or should certain of the record cards within the deck be misoriented, the apparatus will continue to operate and will present the record card, despite its incorrect orientation, to the remaining portion of the article handling apparatus which may result in an incorrect recording or sensing of data on the surface thereof.

Briefly stated, this invention provides a device for the detection of the correct orientation of an article or record card as it is presented to an article or record card handling apparatus. If an article or record card having the correct orientation is presented to the article handling apparatus it will be permitted to pass through the apparatus without impediment. However, should the orientation be other than that desired, the apparatus is immediately halted holding the article or record card which is improperly oriented and preventing its further movement. The article or record card may then be readily removed and the device restarted. Apparatus of the invention employs the unique use of two sensing devices, which may be for example photo-electric or other detection devices placed in the path of movement of the article or record card as it is moved by the article or record handling apparatus. The two sensing devices are offset in such a manner that a first of the sensing devices must be operated prior to the operation of the second to indicate the article or record has the desired orientation. However, should the sensing devices sense the article record card in the opposite sequence, the article or record card is known to have an improper orientation and the apparatus is halted and the article record card seized.

The means for carrying out this orientation determination consists of a transistor amplifier circuit having a variable delay such that proper orientation of an article or record card causes the circuit to produce an output after a long period of delay sufficient to permit the article or record card to pass through the handling apparatus associated with the detector. If the orientation is incorrect, a short period of delay is provided such that the article or record card is immediately seized and the apparatus operation stopped.

It is therefore an object of this invention to provide an improved form of article detection apparatus.

It is another object of this invention to provide a circuit to determine the sequence of occurrence of two events and to provide predetermined outputs in accordance with each of the possible sequences.

It is another object of this invention to provide an improved form of article detection apparatus such that the orientation of the article can be determined and only articles of proper orientation may be passed therethrough.

It is still another object of this invention to provide an improved form of article sensing apparatus for determining the correct orientation of an article as it is presented to an article handling apparatus, said sensing device employing a pair of detection devices in the path of movement of the article and which operates in dependence upon the sequence of operation of the sensing devices.

It is still another object of this invention to provide an improved form of article sensing device for determining the orientation of an article with respect to the path of movement of such article through an apparatus for handling such articles whereby the detection of the characteristics of the leading edge of the article as it is passed tthrough the apparatus permits a determination to be made as to its proper orientation.

It is yet another object of this invention to provide an improved form of article sensing device to determine the orientation of an article as it traverses a path of movement in an article handling apparatus, such device employing a logic determining network whereby the proper sequence of operation of the sensing device is determinative of the orientation of the record as it passes through such an apparatus.

Other objects and features of the invention will be pointed out in defined desecription and claims and illustrated in the accompanying drawings which disclose by way of example, the principle of the invention, and the best mode which has been contemplated for carrying it out.

Figures 4, 5:
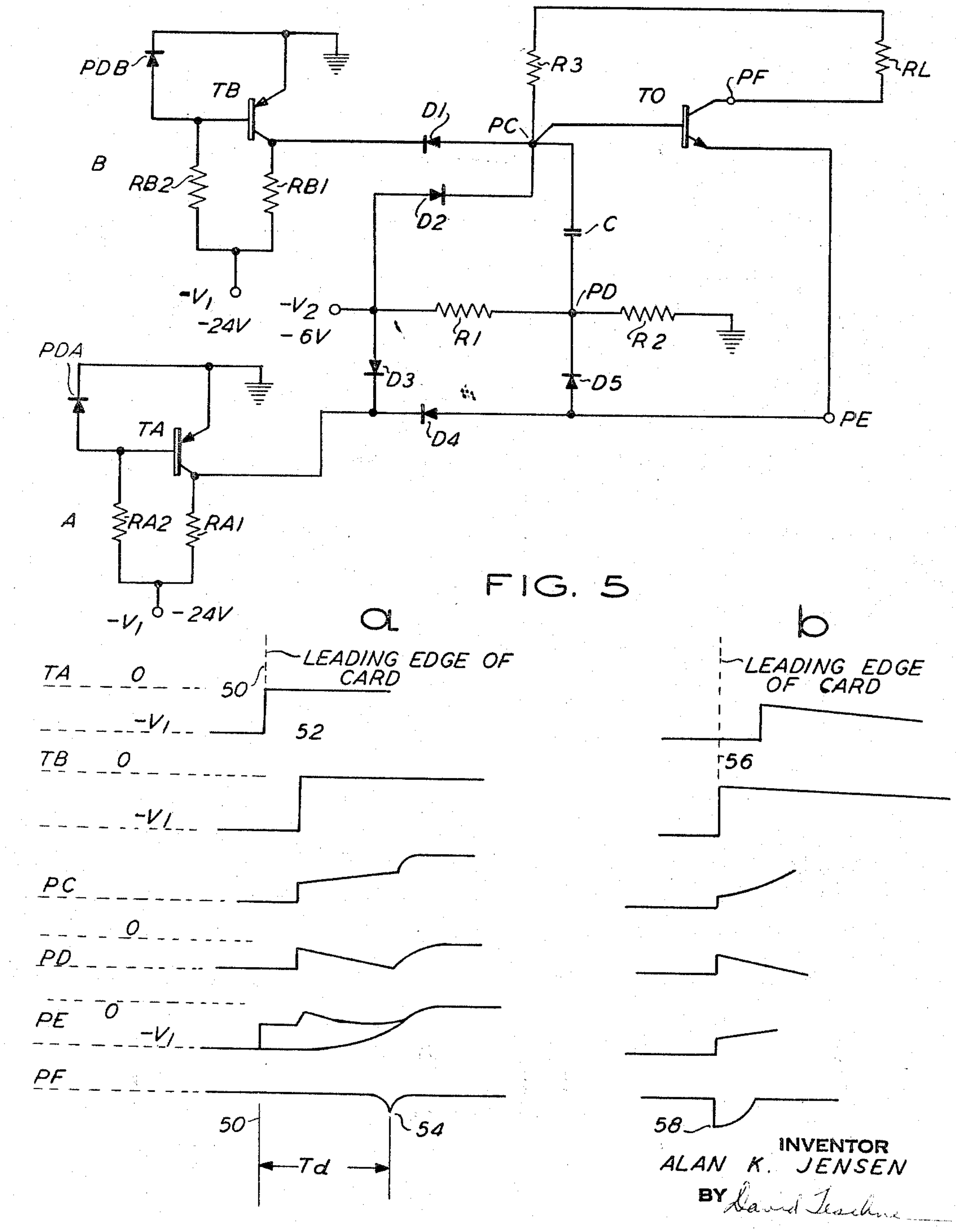
FIG. 4 is a schematic diagram of the circuit employed with the sensing devices of FIGS. 1 and 3.

FIG. 5 consisting of portions *a* and *b*, is a series of wave forms showing the operating characteristics of the circuit of FIG. 4.

Similar elements will be given to characters in each of the respective figures.

Figure 1:
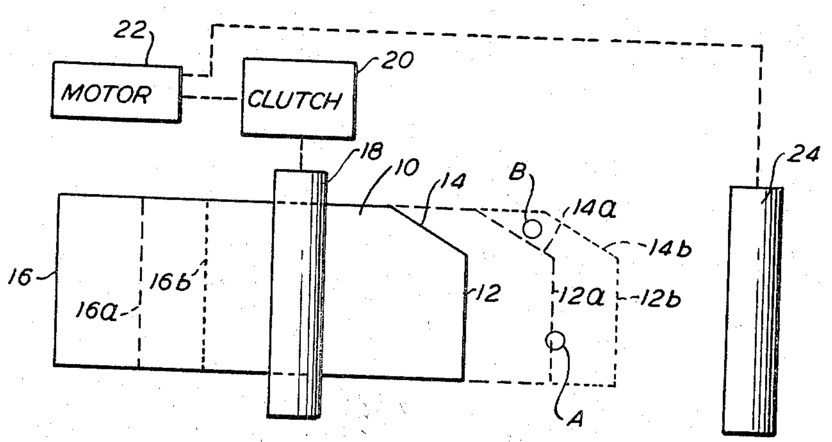
FIG. 1 is a plan view of the apparatus in highly schematic form showing the orientation of a record card with respect to the path of movement within the apparatus and showing the proper orientation of the record card with respect to the sensing devices.

Turning now to FIGURE 1 there is shown the general arrangement of the sensing devices and other major components of the invention as applied to a device for handling record cards. The record card 10 is introduced from a feed hopper and feed roll (not shown) to a first feed roller pair 18. Only the upper roller of the feed roller pair 18 is visible in the figure. The roller pair 18 is driven through a clutch 20 which is in turn connected to a motor 22. The record card 10 is to be passed to a further feed roller pair 24 for further handling of the record card in the record card handling apparatus. The roller pair 24 may be connected to the motor 22 as shown or to another source (not shown).

As can be seen from the figure, the record card 10 has a leading edge 12 from which a corner has been removed, and a trailing edge 16. The absence of the corner is indicated by the inclined edge 14. The record card 10 is passed by means for the feed roller pair 18 first over a photocell A then a second photocell B. The photocells are arranged such that photocell B slightly leads photocell A along the direction of the record card 10 travel along the record card handling apparatus path of movement. Further the photocell B is aligned with the cut corner 14 of the record card 10. The position of the record card 10, shown in solid line, indicates the position of the record card 10 prior to its arrival at the sensing station composed of the photocells A and B. The first set of dashed lines, representing the record card 10 further along the path of movement and showing the positions of the edges 12, 14 and 16 at the positions 12*a*, 14*a* and 16*a*. The edge 12*a* is shown to substantially cover the photocell A. However, the photocell B is not covered by any portion of the record card 10, since edge 14*a* has not as yet reached it. The record card 10 is then moved by the feed roller pair 18 to the position shown in the dotted lines and outlined by the edges 12*b*, 14*b* and 16*b*. It can be seen that in this position both of the photocells A and B, of the sensing station, have been completely occluded by the record card 10. This sequence is the desired sequence and will indicate the proper orientation of the record card 10 with respect to sensing station composed of the photocells A and B.

Figure 3:
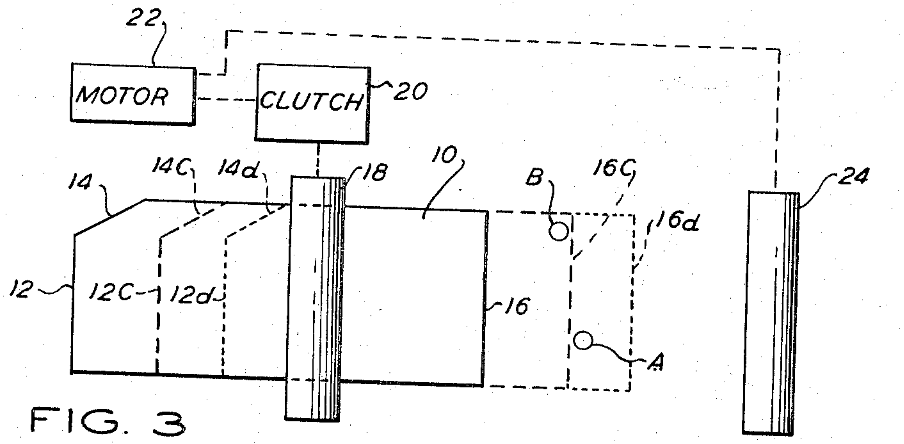
FIG. 3 is a plan view of the devices shown in FIG. 1 but illustrating the improper orientation of the record card with the sensing devices arranged along the path of movement.

Turning now to FIG. 3 the same general arrangement of the components is shown. However, the record card 10 is shown introduced to the sensing station, composed of the photocells A and B in the opposite orientation, that is, with the trailing edge 16 of the record card 10 as shown in FIG. 1 introduced first and the leading edge 12 of FIG. 1 now trailing. In solid line outline the record card 10 indicates its position prior to presentation to the photocells A and B. The second position of the record card 10 indicated by the dashed lines shows the position of the record card 10 such that the photocell B has been occluded while the photocell A is in no way occluded by the record card 10. The record card 10 edges are shown at 12*c*, 14*c* and 16*c*. As the record card 10 is further advanced by means of the feed roller pair 18 to the position shown by the dotted outline and indicated by the edges 12*d*, 14*d* and 16*d*, both of the photocells A and B are fully occluded.

Figure 2:
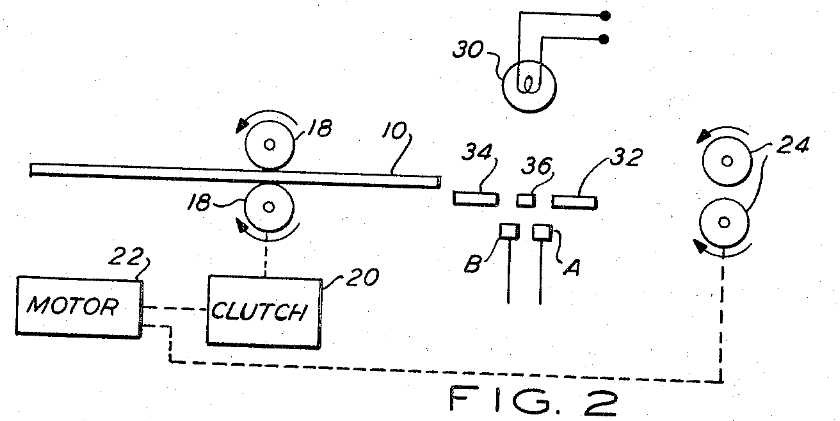
FIG. 2 is a side elevation of a device of FIG. 1 showing in more detail the placement and arrangement of the sensing devices with respect to the record card.

Turning now to FIG. 2 a side view of the apparatus of FIGS. 1 and 3 can be seen. The record card 10 is shown in the position between the feed roller pair 18. The feed roller pair 18 is shown driven by means of the clutch 20 and the motor 22. The additional feed roller pair 24 is also shown coupled to the motor 22. A lamp 30 is mounted above the path of movement of the record card 10 and may be connected to a source of power (not shown). Light from the lamp passes down to an apertured plate 32 having control apertures 34 and 36 so as to limit the amount of light applied to the photocells B and A, respectively, mounted under the control apertures 34 and 36. The control apertures 34 and 36 insure that the photocells A and B are not erroneously illuminated by stray light from the lamp 30.

Turning now to FIG. 4, the logic for making the determination as to the order of the operation of the photocells A and B of FIGS. 1, 2 and 3 is shown. The photocell A of FIGS. 1 through 3 is a photo-diode PDA, whereas the photocell B is a photo-diode PDB. Photo-diode PDA has its cathode connected to the emitter of a transistor TA and also connected to ground. The anode of the photo-diode PDA is connected the base of a PNP transistor TA and through a resistor RA2 to a source of negative potential —V1. The collector of the transistor TA is connected to a resistor RA1 to the same source of negative potential —V1. The resistors RA1 and RA2 serve as bias resistors for the anode and collector of the photo-diode PDA and the transistor TA, respectively. In a similar fashion photo-diode PDB has its cathode connected to the emitter of a transistor TB and also to ground. The anode of the photo-diode PDB is connected to the base of a PNP transistor TA and via a bias resistor RB2 to a source of negative potential —V1. The collector of the transistor TB is connected via a further biasing resistor RB1 to the source of negative potential —V1. The collector of the transistor TB is connected to the cathode of diode D1 whose anode is connected to a junction point PC. Also connected to the junction point PC is a resistor R3 connected in parallel with a further resistor RL which represents a load or the input resistance of a further transistor stage. The resistor RL is further connected to the collector of an NPN transistor TO. The base of the transistor TO is connected to the junction PC. The cathode of a silicon diode D2 is connected to the point PC and its anode is connected to a terminal point coupled to a source of negative potential —V2.

The junction point PC is further connected to one plate of a capacitor C the other plate of which is coupled to a junction point PD. A resistor R1 is coupled between the junction point PD and the source of negative potential —V2. In addition, junction point PD is coupled through a resistor R2 to ground. The resistors R1 and R2 with respect to the ground and the negative source —V2 serves as a voltage divider for the point PD. The junction point PD is further coupled to the cathode of a germanium diode D5, the anode of which is connected to the emitter of transistor TO and also to the anode of a further germanium diode D4. The cathode of the diode D4 is coupled to the collector of the transistor TA and also to the cathode of a further germanium diode D3. The anode of the diode D3 is coupled to a negative source of potential —V2.

In the quiescent condition, that is with light applied to both of the photo-diodes PDA and PDB they will appear as low impedances providing current paths for the —V1 supplies and by passing the bases of the transistors TA and TB. As a result there will be no output provided by the collectors of the transistors TA and TB. Circulating currents will appear from ground to the —V2 supply across the resistors R1 and R2 establishing a voltage level at the point PD. In addition, a circulating current will appear from the —V2 supply via the diode D3 to the —V1 supply. Further circulating currents will appear from the —V2 supply via the diode D2, the diode D1 to the —V1 supply. Some current will also be circulating as a result of the bias on the collector of the transistor TO from sources not shown which represent the stages to which the device may be coupled and further currents will circulate through the path including the resistor R3 the diode D1 to the —V1 supply. Both of the inputs A and B will be held to potentials of approximately —V2 volts due to the circulating currents; the first in the path including the diodes D2 and D1 and the second in the path including the diode D3. Since the diode D2 is of silicon whereas the diode D3 is of germanium, the voltage drop through the path including the diode D2 will be somewhat greater than that through the remaining diodes insuring that the base of the transistor TO is maintained more negative than the emitter, holding the transistor TO in the off condition. It should be understood however that these voltages are both slightly more negative than the —V2 supply itself due to the diode drop. This will be the condition that maintains prior to the receipt of signals from either of the photo diodes A or B.

Assume now the record card 10 has taken the position shown by the dashed lines in FIG. 1 and outlined by the edges 12*a*, 14*a* and 16*a*. In this position the photo-diode A will be occluded from the light source 30 as shown in FIG. 2. As a result of the cutoff of the light by means of the record card 10, the impedance of the photo-diode PDA will rise and will cause the base of the transistor TA to go negative as a result of the source —V1 and the bias resistor RA2. This will cause the transistor TA to conduct and apply an output at ground level at its collector and thus to the cathodes of the diodes D4 and D3 causing them to be cut off. As a result of the cutoff of the diodes D3 and D4 the emitter of the transistor TO will become floating and will have a value of voltage somewhere between —V2 and that existing at the point PD. The transistor TB will still remain off due to photodiode PDA remaining uncovered. Transistor TO is maintained off because the emitter is held above —V2 while the base is more negative than —V2 due to the drop in diode D2. This change in the output level of the transistor TA is shown by the line TA of the FIG. 5 part *a*. At step 50, it is assumed that the leading edge of the record card 10 has completely occluded the photocell A causing the transistor TA to change its output level from approximately —V2 to a value of ground or 0. As shown by the line TE of FIG. 5 part *a*, the emitter of the transistor TO will now take on a floating value somewhere between —V2 and a value PD.

As the record card 10 of FIG. 1 continues to advance to the position shown by the dotted lines and indicated by the edge positions 12*b*, 14*b* and 16*b* both of the photo diodes A and B, PDA and PDB will be occluded from the light source 30. As a result, the photo diode PDB will now go to its high impedance state and cause the transistor TB to be turned on and produce a ground potential at its collector output. This is shown in line TB of FIG. 5 part *a* where at point 52 the record card 10 is considered to cover both of the photo diodes A and B as shown in FIG. 1. As a result diodes D1 and D2 are cut off and the capacitor C instantaneously acts as a short circuit connecting resistor R3 in parallel with R2 to ground. Voltages at the points PC and PD on opposite side of the capacitor C both tend to move in a positive direction as shown in lines PC and PD of FIG. 5 part *a* at approximately the point 52. Due to the change of voltages at the point PD the emitted of the transistor TO will tend to move further towards ground. The transistor TO will remain off as the point PD was initially more positive than the point PC due to the voltage divider composed of resistors R1 and R2. The positive step however of the points PC and PD will both be equal. Following this initial step due to appearance of the input from the transistor TB, the capacitor C begins to charge with PC moving more positively due to presence of resistor R3 while the point PD begins to move negatively towards its initial value as determined by the path, from ground via the resistors R2, R1 to the —V2 negative supply. The point PC continues to become positive as the point PD becomes more negative. This is shown in the points PC and PD of FIG. 5 part *a*. As a result of the movements of the points PC and PD, the base-emitter diode of the transistor TO as well as the diode D5 become forward biased, permitting conduction of the transistor TO and the production of the output PF directed to the load resistor RL. The time of occurrence of the signal PF is shown on the line PF of FIG. 5 part *a* at the point 54. The total elapse time between the points 50 at which time the leading edge 12 of the record card 10 was sensed by the photocell A and the time at which the signal PF is available to the load resistor RL is indicated by the time TD. This is the total time delay which is required for the circuit to react and produce an output. The signal at RL is also applied to the clutch 20 of the record advancing device of FIG. 1 (not shown) causing the clutch 20 to disengage and stop the forward movement of the record card 10 under control of the feed roller pair 18. This operation, however, will be ineffective to trap the record card 10 in that the delay TD between the points 50 and 54 is sufficiently long to permit the record card 10 to be advanced entirely through the area controlled by the feed roller pair 18 and the sensing devices TA and TB and have been placed under control of the further feed rolls 24. Passage of the trailing edge 16 of the record card 10 beyond the photocells A and B will cause the entire device to be reset for operation with the next record card 10.

It can be seen that the device operates to produce a stopping signal but that this stopping signal is delayed for a sufficient length of time to permit the record card 10 to be passed therethrough and to effectively not prevent the operation of the system. As will be seen from the description below, where a record card 10 is introduced with the wrong orientation the delay period between the arrival of the effective leading edge of the record card 10 (actually the trailing edge 16) is very short and thus is sufficient to permit the feed roller pair 18 to hold onto the record card 10 and fail to pass it further to the feed roller pair 24.

Considering now the instance where record card 10 is fed with the orientation as shown in FIG. 3 and occupies the locations indicated by the solid lines the normal quiescent condition of the device will be observed. As the record card 10 moves to the position shown by the dashed outlines 12*c*, 14*c* and 16*c* photo diode PDB or the photocell B will be first to be occluded. This is shown in line TB of FIG. 5 part *b*, with the point 56 which is considered to be the edge 16*c* occluding the photocell B or photo-diode PDB of FIG. 4. Photo diode PDB will go to its high impedance state and transistor will conduct and produce an output signal at ground potential. As a result of the application of ground to the cathode of the diode D1, the diode D1 is cut off causing the points PC and PD to take their initial step as is shown in the lines PC and PD of FIG. 5 part *b*. This initial step is made to exceed the difference in voltage between low level voltage and the collector of the transistor TA and that existing at the base of the transistor TO. As a result the base of the transistor TO will begin to move positively with respect to the potential at the collector of transistor TA and the base-emitter diode of transistor TO from the diode D4 will become forward bias supplying an output PF immediately. This is shown at the point 58 which occurs almost instantaneously with the arrival of the trailing edge of the record card 10 at the photocell B as shown by the line TB of FIG. 5 part *b*. As a result, the clutch 20 of FIG. 2 will be instantaneously operated seizing the record card 10 then being passed by the feed roller pair 18 and stopping it in its place. The record card 10 would then be removed by hand and the operation restarted by the exposure of both photocells A and B to the lamp source 30.

It should be noted that when the transistor TO is turned on it acts in part as an emitter follower pulling the junction points PD positive at the same rate as the point PC and thereby essentially eliminating the effects of the capacitor C1. In this manner all the current available to the resistor R3 can be diverted to the base of the transistor TO providing rapid boot strapping and providing a rapid rise time for the output. The only limitation upon the circuit in eliminating the effects of the capacitor C is that the voltage gain of the emitter follower must be approximately equal to one. This, however, with modern-day transistors offers little problem in that their voltage gain normally would be approximately 0.98 thus reducing the capacitor C to approximately 2% of its actual capacitance value. The resistor RL representing the load or, in this instance, the clutch 20 of FIG. 1 must be low if it is to be returned to ground potential otherwise it would have to be returned to a more positive potential.

Thus it can be seen from the above description that the same circuit depending upon the sequence of the inputs may act as one in which the output is delayed if the sequence is correct or may act instantaneously if sequence is incorrect.

While there have been shown and described the concepts of this invention as pertaining to a signal embodiment thereof, it should be obvious that many changes and omissions and substitutions in the form and content of these circuits may be made without departing from the scope of the invention.

What is claimed is:

1. An article sensing apparatus for sensing the orientation of an article as it is moved along the path of an article handling device, said article capable of bearing indicia in a predetermined location thereon, said article sensing apparatus comprising: article advancing means mounted adjacent said path for advancing said article through said article handling device; selectively operable drive means coupled to said article advancing means to selectively operate said article advancing means; first sensing means mounted adjacent said path and aligned with a first predetermined portion of said article; second sensing means mounted adjacent said path and aligned with a second predetermined portion of said article, said second sensing means displaced from said first sensing means along said path opposite to the direction of the article movement; logic means coupled to said first and second sensing means; said logic means producing a first signal after a first predetermined time when said article is sensed first by said first sensing means and then by said second sensing means indicating that the article has the desired orientation and a second signal after a second predetermined time when said article is sensed first by said second sensing means and then by said first sensing means indicating that said article has an undesired orientation; and control means coupled to said logic means and said selectively operable drive means and responsive to said second signal to stop the operation of said drive means and prevent the further advancing of said article.

2. An article sensing apparatus as defined in claim 1 wherein said first and second sensing means are each switch members.

3. An article sensing apparatus as defined in claim 1 wherein said first and second sensing means are each photoelectric devices.

4. An article sensing apparatus as defined in claim 3 wherein said article is a record card, said predetermined indicia location containing indicia having a different reflectivity than the remainder of said record card.

5. An article sensing apparatus as defined in claim 3 wherein said article is a record card, said indicia at said predetermined location consisting of the selective removal of a portion of said record card.

6. An article sensing apparatus as defined in claim 3, wherein said article is a record card having a magnetizable surface, said indicia at said predetermined location consisting of the selective removal of a portion of said record card, the desired orientation of said record card presenting said magnetizable surface to said article advancing means.

7. An article sensing apparatus as defined in claim 3, wherein said logic means comprises a transistor for providing said signal and variable biasing means coupled to said transistor to control the time of application of said signal to selectively operable drive means in accordance with the sequence of sensing said article by said first and second sensing means.

8. An article sensing apparatus as defined in claim 5, wherein said logic means comprises a transistor for providing said signal, said transistor having a base electrode, an emitter electrode and a collector electrode, biasing means coupled between the base electrode and the emitter electrode of said transistor and to said first and second sensing means, said transistor being biased to a first level when said article is sensed first by said first sensing means and then by said second sensing means, causing said transistor to provide said signal after said first predetermined time; said transistor being biased to a second level when said article is sensed first by said second sensing means and then by said first sensing means causing said transistor to provide said signal after said second predetermined time.

9. An article sensing apparatus as defined in claim 8, wherein said second predetermined time is shorter than said first predetermined time whereby upon the occurrence of said second signal at said second predetermined time, said article will be held by said selectively operable drive means, but upon the occurrence of said first signal at said first predetermined time, said article will not be held by said selectively operable drive means.

10. An article sensing apparatus for sensing the orientation of an article as it is moved along the path of an article handling device, said article sensing apparatus comprising: selectively operable article advancing means mounted adjacent said path for advancing said article through said article handling device; first sensing means mounted adjacent said path and aligned with a first predetermined portion of said article; second sensing means mounted adjacent said path and aligned with a second predetermined portion of said article, said second sensing means displaced from said first sensing means along said path opposite to the direction of article movement; logic means coupled to said first and second sensing means; said logic means producing a first signal after a first predetermined time when said article is sensed first by said first sensing means and then by said second sensing means indicating that the article has the desired orientation and a second signal after a second predetermined time when said article is sensed first by said second sensing means and then by said first sensing means indicating that the article has an undesired orientation; and control means coupled to said logic means and said selectively operable article advancing means and responsive to said second signal to stop said selectively operable article advancing means and prevent the further advancing of said article.

11. An article sensing apparatus as defined in claim 10 wherein said first and second sensing means are each photoelectric devices.

12. An article sensing apparatus as defined in claim 11 wherein said article is a record card capable of bearing indicia thereon.

References Cited

UNITED STATES PATENTS 3,119,487 1/1964 Wyle ............... 198—33

EVON C. BLUNK, *Primary Examiner.*

RICHARD E. AEGERTER, *Examiner.*